United States Patent
Matsutani (10) Patent No.: US 7,536,058 B2
(45) Date of Patent: May 19, 2009

(54) IMAGING APPARATUS AND IMAGING METHOD FOR COMPRESSING IMAGE DATA TO A FIXED LENGTH

(75) Inventor: Atsushi Matsutani, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 10/919,445

(22) Filed: Aug. 17, 2004

(65) Prior Publication Data

US 2005/0068425 A1    Mar. 31, 2005

(30) Foreign Application Priority Data

Aug. 25, 2003 (JP) ............................ 2003-300635

(51) Int. Cl.
*G06K 9/36* (2006.01)
(52) U.S. Cl. ..................... 382/239; 382/232
(58) Field of Classification Search ......... 382/232–253; 348/231.99–231.6
See application file for complete search history.

(56) References Cited

U.S. PATENT DOCUMENTS

| | | | | |
|---|---|---|---|---|
| 5,517,583 | A * | 5/1996 | Horiuchi et al. | ............. 382/239 |
| 6,195,462 | B1 * | 2/2001 | Bryniarski et al. | ........... 382/239 |
| 7,174,045 | B2 * | 2/2007 | Yokonuma | ................... 382/232 |
| 2001/0024528 | A1 * | 9/2001 | Yokonuma | ................... 382/239 |
| 2002/0106130 | A1 * | 8/2002 | Yokonuma | ................... 382/232 |
| 2004/0105585 | A1 * | 6/2004 | Yokonuma | ................... 382/232 |

FOREIGN PATENT DOCUMENTS

| | | |
|---|---|---|
| JP | 7-312751 | 11/1995 |
| JP | 9-294265 | 11/1997 |
| JP | 2001-169280 | 6/2001 |

* cited by examiner

*Primary Examiner*—Jingge Wu
*Assistant Examiner*—Sean Motsinger
(74) *Attorney, Agent, or Firm*—Oblon, Spivak, McClelland, Maier & Neustadt, P.C.

(57) ABSTRACT

An imaging apparatus comprises an imaging device to take an image, a device to create a main image by resizing a main image before compressing imaged by the imaging device, and then by compressing to a fixed length, a device to create a reduced image for display by resizing to reduce the main image before compressing, and then by compressing the reduced main image before compressing, a device to estimate a most appropriate compression parameter for compressing the main image before compressing, which is resized to create the main image, in the proximity of a target size based on a data created by the device to create a reduced image for display, and a compression device to obtain a most appropriate compression rate based on the most appropriate compression parameter, and then to compress the main image before compressing to the fixed length by the most appropriate compression rate.

4 Claims, 10 Drawing Sheets

CORRELATION WHEN YUV IMAGE FOR THUMBNAIL AND YUV IMAGE FOR MAIN IMAGE ARE COMPRESSED BY COMPRESSION RATE T0

FIG. 6

RELATIONSHIP BETWEEN HIGH-FREQUENCY COMPONENT AND y-INTERCEPT

IMAGING APPARATUS AND IMAGING METHOD FOR COMPRESSING IMAGE DATA TO A FIXED LENGTH

BACKGROUND OF THE INVENTION

1. Field of the Invention

The present invention relates to an imaging apparatus and an imaging method which conduct fixed length compression. More particularly, the invention relates to an imaging apparatus and an imaging method, which reduce the number of processes for compressing a main image to a fixed length.

2. Description of the Related Art

For a still image compression format in an image processing apparatus such as a digital camera, JPEG (Joint Photographic Experts Group) has been adopted as a standard. In an image cording apparatus having a limitation for recording capacity such as a digital camera, there has been a demand for an image size to be a fixed length in order to indicate remaining number of imageable sheets for a user. Therefore, it has been becoming common that fixed length cording is carried out by JPEG format of a variable length cording method. On the other hand, when an image is created by a digital camera, it is common that as well as a main image, a reduced image for display is created in order to simply distinguish contents of a file, and it is usual that the main image and the reduced image for display are created from the same data.

As the above imaging apparatus which conducts a conventional fixed length compression, there are image processing method and image processing apparatus disclosed in JP-A-H09-294265 which were proposed by the present applicant. This apparatus converts image data into frequency transform coefficient by using discrete cosine transform coefficient, and quantizes by using quantization coefficient denoting weight of the quantization of the converted frequency transform coefficient. The apparatus encodes the quantized data, and detects a data coding amount coded at each predetermined time interval during execution of the coding processing of the quantized data by the coding means, and then revises the quantization coefficient based on the detected code amount during the execution of the coding processing.

However, in the above invention, a method to decrease the amount of time for a fixed length is considered separately from the creation of the reduced image for display. Since an image size depends upon contents of an image, the image size is determined after the image is actually compressed. Accordingly, when the image is compressed, and if the compressed image is not fitted to a target size, a compression size was required to be changed.

SUMMARY OF THE INVENTION

The present invention has been made in view of the above described problems, and it is an object of the present invention to provide an imaging apparatus and an imaging method, which reduce the amount of time for a fixed length by using data when a reduced image for display is created, and has a device to image at least an image or a video picture and to compress the image or the video image to a fixed length.

In order to solve the above problems, an imaging apparatus of the present invention comprises an imaging device to take an image, a device to create a main image by compressing a main image before compressing imaged by the imaging device to a fixed length, a device to create a reduced image for display by compressing the main image before compressing, a device to estimate a most appropriate compression parameter for compressing the main image before compressing in the proximity of a target size based on a data created by the device to create a reduced image for display, and a compression device to obtain a most appropriate compression rate based on the most appropriate compression parameter, and then to compress the main image before compressing to the fixed length by the most appropriate compression rate.

According to the imaging apparatus of the present invention, the most appropriate compression parameter comprises a compression parameter for compressing the main image before compressing to the reduced image for display and a compression size compressed by the compression parameter.

According to the imaging apparatus of the present invention, the device to estimate a most appropriate compression parameter previously expresses a correlation when the main image before compressing is compressed by the same compression parameter with the compression parameter for compressing the main image before compressing to the reduced image for display as a mathematical model, and estimates a compression result compressed by the compression parameter when the main image is created from the main image before compressing by inputting the compression result compressed by the compression parameter when the reduced image for display is created from the main image before compressing into the mathematical model.

According to the imaging apparatus of the present invention, the device to estimate a most appropriate compression parameter uses both data obtained from an image before an imaging command or the main image before compressing of just after imaging and data created by the device to create a reduced image for display.

According to the imaging apparatus of the present invention, the device to estimate a most appropriate compression parameter uses both a high-frequency component extracted from the image before the imaging command or the main image before compressing of just after imaging and the data created by the device to create a reduced image for display.

According to the imaging apparatus of the present invention, the device to estimate a most appropriate compression parameter preliminarily creates a mathematical model having input of the high-frequency component extracted from the image before the imaging command or the main image before compressing of just after imaging and a compression result of the reduced image for display, and output of a compression result of the image, and estimates the compression result of the image by inputting the high-frequency component and the compression result to the mathematical model at the time of photographing.

According to the imaging apparatus of the present invention, the most appropriate compression parameter includes data obtained by compressing an intermediate size image which is created when the main image before compressing is resized to the reduced image for display.

An imaging method of the present invention comprises the steps of taking an image, creating a main image by compressing a main image before compressing imaged by the step of taking an image to a fixed length, creating a reduced image for display by compressing the main image before compressing, estimating a most appropriate compression parameter for compressing the main image before compressing in the proximity of a target size based on a data created by the step of creating a reduced image for display, and compressing the main image before compressing to a fixed length by a most appropriate compression rate which is obtained based on the most appropriated parameter.

According to the imaging method of the present invention, the most appropriate compression parameter comprises a compression parameter for compressing the main image before compressing to the reduced image for display and a compression size compressed by the compression parameter.

According to the imaging method of the present invention, the step of estimating a most appropriate compression parameter previously expresses a correlation when the main image before compressing is compressed by the same compression parameter with the compression parameter for compressing the main image before compressing to the reduced image for display as a mathematical model, and estimates a compression result compressed by the compression parameter when the main image is created from the main image before compressing by inputting the compression result compressed by the compression parameter when the reduced image for display is created from the main image before compressing into the mathematical model.

According to the imaging method of the present invention, the step of estimating a most appropriate compression parameter uses both data obtained from an image before an imaging command or the main image before compressing of just after imaging and data created by the step of creating a reduced image for display.

According to the imaging method of the present invention, the step of estimating a most appropriate compression parameter uses both a high-frequency component extracted from the image before the imaging command or the main image before compressing of just after imaging and the data created by the step of creating a reduced image for display.

According to the imaging method of the present invention, the step of estimating a most appropriate compression parameter preliminarily creates a mathematical model having input of the high-frequency component extracted from the image before the imaging command or the main image before compressing of just after imaging and a compression result of the reduced image for display, and output of a compression result of the image, and estimates the compression result of the image by inputting the high-frequency component and the compression result to the mathematical model at the time of photographing.

According to the imaging method of the present invention, the most appropriate compression parameter includes data obtained by compressing an intermediate size image which is created when the main image before compressing is resized to the reduced image for display.

According to the imaging method of the present invention, the imaging method further comprises a determination device to determine whether a size of a compression image compressed based on the most appropriate compression parameter is in the proximity of a target size or not, and a correction device to correct the most appropriate compression parameter in accordance with a result of the determination device.

DETAILED DESCRIPTION OF THE PREFERRED EMBODIMENTS

Hereinafter, embodiments of the present invention will be described in detail with reference to the drawings. Here, examples are given when the imaging apparatus of the present invention was applied to a digital camera.

Figure 1A:
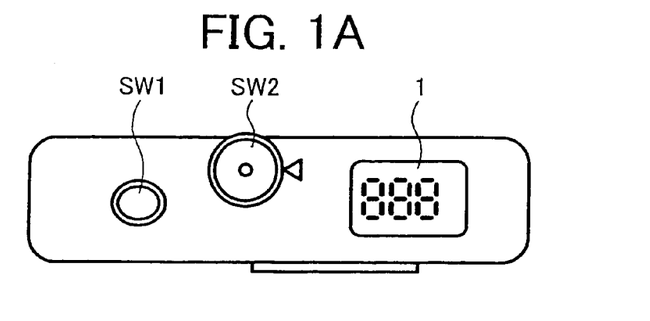
FIG. 1A is a plan view illustrating the external appearance structure of the digital camera of the imaging apparatus according to the first embodiment of the present invention.
Figure 1B:
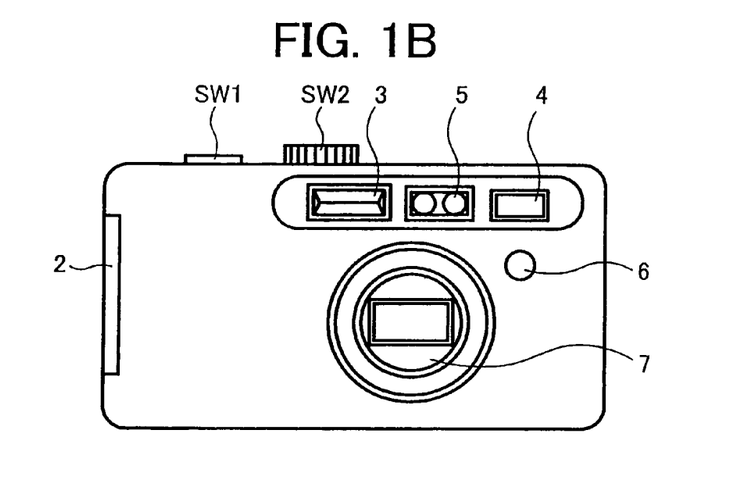
FIG. 1B is a front view illustrating the external appearance structure of the digital camera of the imaging apparatus according to the first embodiment of the present invention.
Figure 1C:
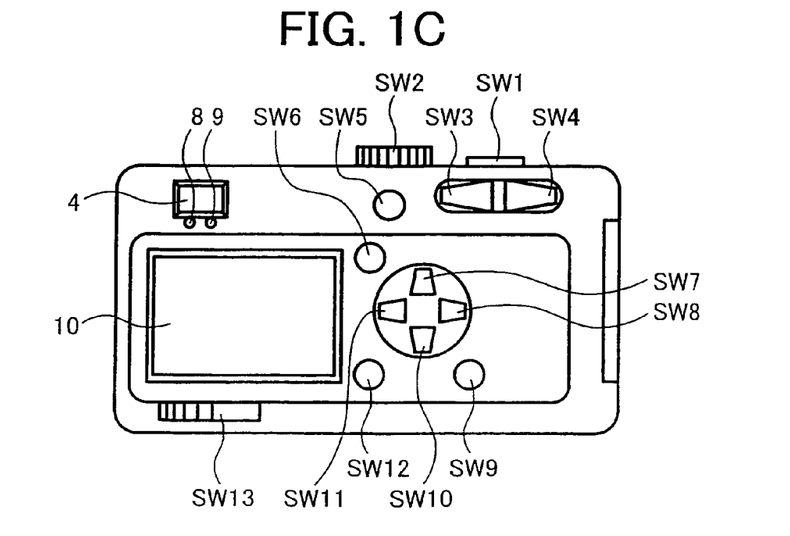
FIG. 1C is a back view illustrating an external appearance structure of the digital camera of the imaging apparatus according to the first embodiment of the present invention.
Figure 2A:
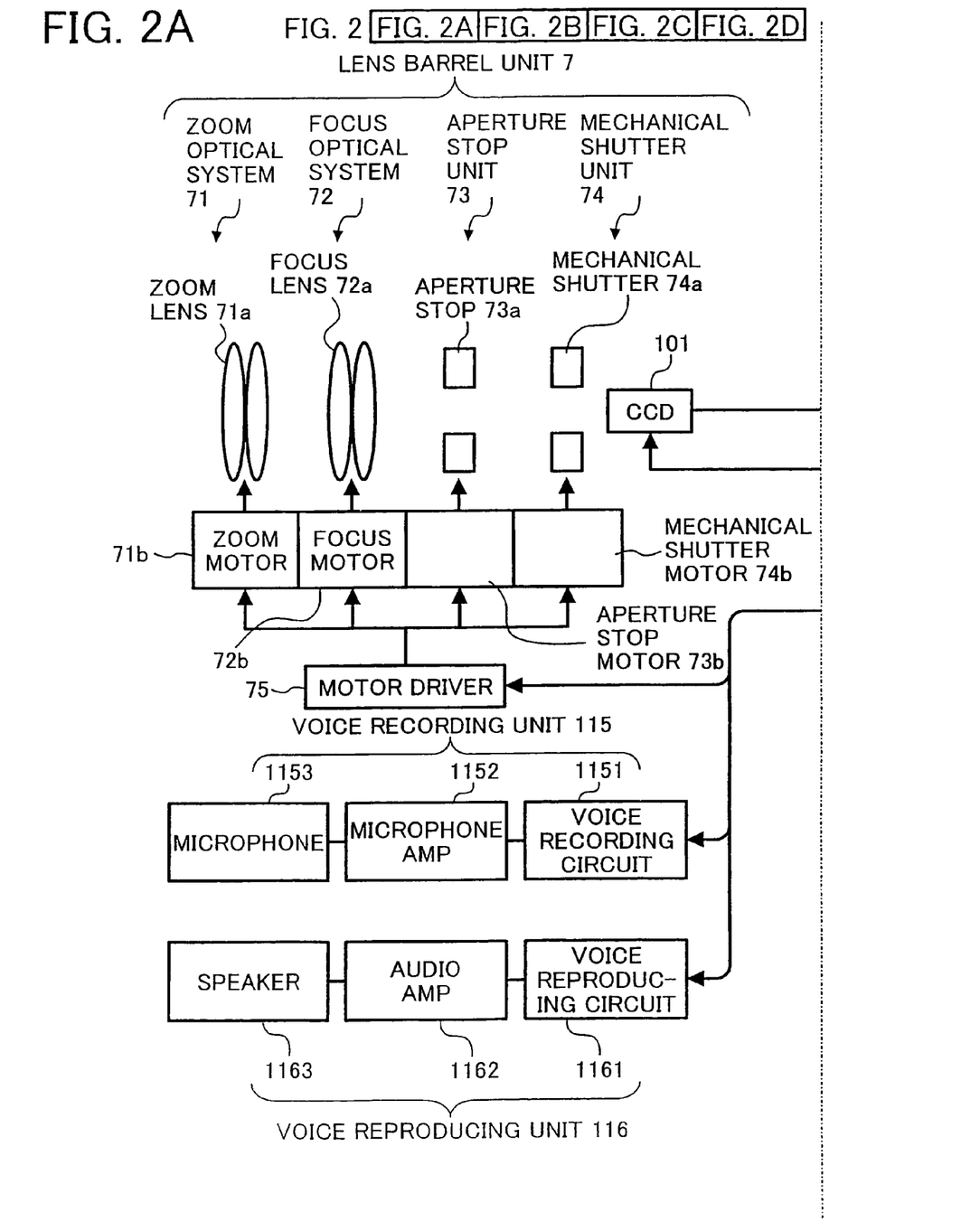
FIG. 2 is a block diagram illustrating the structure of each section in the digital camera of the imaging apparatus according to the first embodiment of the present invention.
Figure 2B:
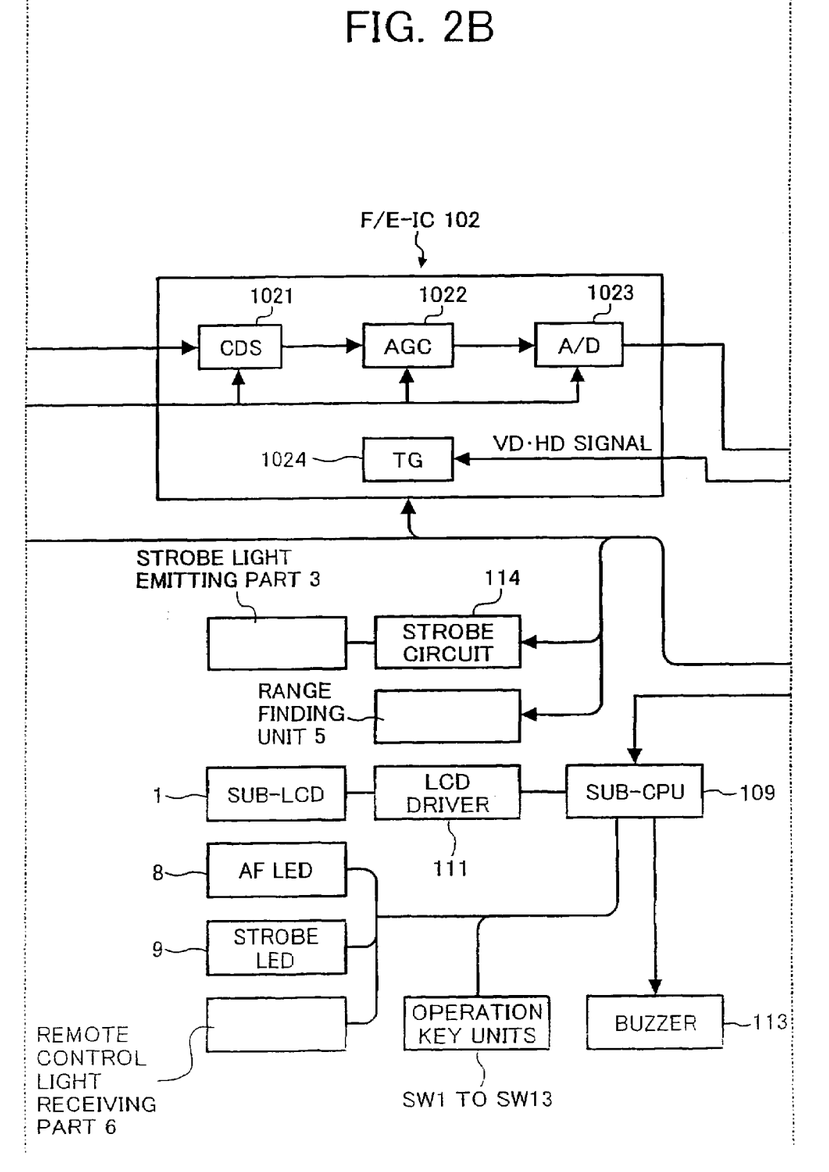
Figure 2C:
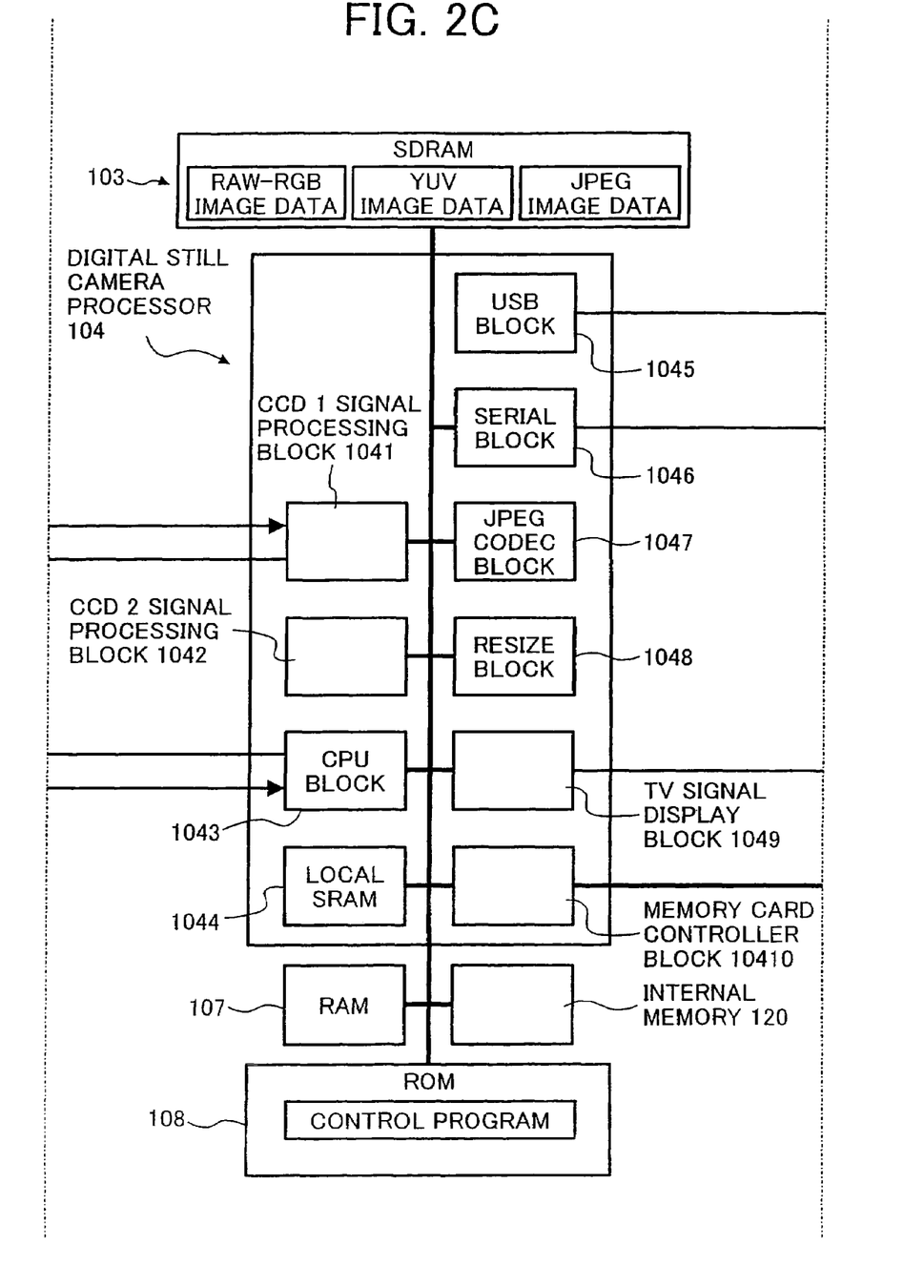
Figure 2D:
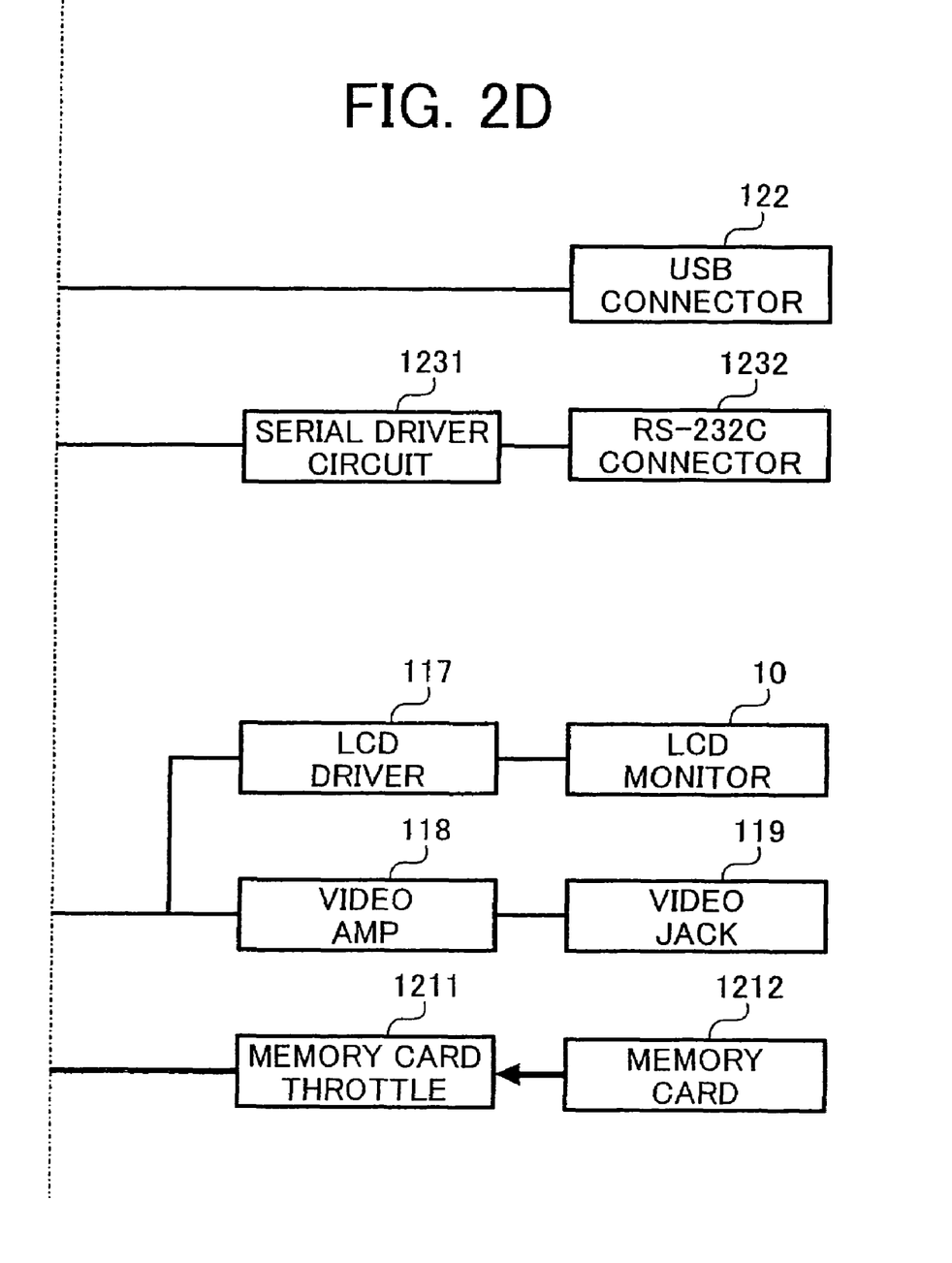

First, a structure of a digital camera to which a first embodiment of the imaging apparatus of the present invention was applied is described with reference to FIGS. 1A, 1B, 1C, 2. FIGS. 1A, 1B, 1C are external views respectively illustrating the structures of digital camera to which the first embodiment of the imaging apparatus of the present invention was applied. FIG. 1A is a plan view, FIG. 1B is a front view, and FIG. 1C is a back view. FIG. 2 is a block diagram illustrating the structure of digital camera to which the first embodiment of the imaging apparatus of the present invention was applied.

As shown in FIG. 1A, the top surface of the digital camera comprises a sub LCD1, a shutter release button SW1, and a mode dial SW2. The front surface of the digital camera comprises a SD card/battery cover 2, a strobe light emitting part 3, an optical finder 4, a range finding unit 5, a remote control light receiving part 6, and a lens barrel unit 7 as shown in FIG. 1B. The back surface of the digital camera comprises an AF LED 8, the optical finder 4, a strobe LED 9, a LCD monitor 10, and switches SW1 to SW13 as shown in FIG. 1C. The switch SW 1 is the shutter release button, SW2 is the mode dial, SW3 is a ZOOM switch (WIDE), SW4 is a ZOOM switch (TELE), SW5 is a self timer/delete switch, SW6 is a MENU switch, SW7 is a top/strobe switch, SW8 is a right switch, SW9 is a display switch, SW10 is a bottom/micro switch, SW11 is a left/image confirming switch, SW12 is a OK switch, and SW 13 is a power switch.

A structure of each section of the digital camera will be described with reference to FIG. 2.

The lens barrel unit 7 comprises a zoom lens 71a for importing an optical image of an object, a zoom optical system 71 having a zoom driving motor 71b, a focus lens 72a, a focus optical system 72 having a focus driving motor 72b, an aperture stop 73a, an aperture stop unit 73 having an aperture stop motor 73b, a mechanical shutter 74a, a mechanical shutter unit 74 having a mechanical shutter motor 74b, and a motor driver 75 for driving each motor.

The motor driver 75 is driven and controlled by driving commands from a CPU block (Central Processing Unit) 1043 in the after-mentioned digital still camera processor 104, based on the input of remote control light receiving part 6 and the operation input of the operation key units SW1 to SW13.

A control program which is written by decodable codes in the CPU block 1043 and a parameter for controlling are stored in a ROM 108. When the power of digital camera is turned on, the control program stored in the ROM 108 is loaded in a main memory (not shown), and the CPU block 1043 controls the operation of each section in the apparatus in accordance with the program, and also temporarily stores the data required for the control and the like in a RAM 107 and a local SRAM 1044 provided in the after-mentioned digital still camera processor 104. The control program and the parameter for controlling can be changed by using a rewritable flash ROM for the ROM 108, so the functions can be easily upgraded.

A CCD (Charged Coupled Device) 101 is a solid-state image sensing device for photoelectrically converting an optical image. A F/E (front/end)-IC 102 includes a CDS (Correlated Double Sampling) 1021 which conducts correlated double sampling for eliminating image noise, an AG (Automatic Gain Control) 1022 for adjusting gain, an A/D (Analogue/Digital) 1023 for carrying out digital signal conversion, and a TG 1024 for generating a driving timing signal. A vertical synchronization signal (hereinafter referred to as VD) and a horizontal synchronization signal (hereinafter referred to as HD) are supplied to the TG 1024 from the CCD 1 control block 1041, and the TG 1024 generates the driving timing signals of the F/E-IC 102 and the CCD 101 controlled by the CPU block 1043.

The digital still camera processor 104 carries out a white balance setup and a gamma setup for the output data of F/E-IC102 from the CCD 101. The digital still camera processor 104 also includes the CCD 1 control block 1041 for supplying VD and HD signals as described above, a CCD 2 control block 1024 for converting into brilliance data and chrominance difference data by a filtering process, the CPU block 1043 for controlling operations of the above described each section of the apparatus, the Local SRAM 1044 for temporarily storing data and the like required for the foregoing controls, an USB block 1045 for conducting USB communication with an external device such as a personal computer, a serial block 1046 for performing serial communication with an external device such as a personal computer, a JPEG CODEC block 1047 for carrying out JPEG (Joint Photographic Experts Group) compression and expansion, a RESIZE block 1048 for enlarging and reducing a size of image data by an interpolation process, a TV signal display block 1049 for converting image data into a video signal for displaying on an external display device such a liquid crystal monitor or a TV, and a memory card control block 10410 for controlling a memory card 1212 which records photographed image data.

The SDRAM 103 temporarily stores image data when various processes are applied to the image data by the above described digital still camera processor 104. The image data to be stored is for example, RAW-RGB image data, which is imported from the CCD 101 via the F/E-IC 102, having a state that the white balance setup and the gamma setup are conducted in the CCD 1 signal processing block 1041, YUV image data having a state that the brilliance data and the chrominance data conversion are carried out in the CCD 2 control block 1042, and JPEG image data to which JPEG compression is applied in the JPEG CODEC block 1047.

A memory card throttle 1211 is a throttle for mounting an attachable and detachable memory card 1212. An internal memory 120 is a memory for storing photographed image data when a memory card is not mounted on the aforementioned memory card throttle 1211.

An LCD driver 117 is a driving circuit for driving the after-mentioned LCD monitor 10. The LCD driver 117 also has a function for converting the video signal output from the TV signal display block 1049 into a signal for displaying on the LCD monitor 10. The LCD monitor 10 monitors an object before photographing and checks the photographed image, and is a monitor for displaying image data recorded in a memory card and the above mentioned internal memory 120.

A video AMP 118 is an amplifier for converting the video signal output from the TV signal display block 1049 into 75 Ω impedance, and a video jack 119 is a jack for connecting with an external display device such as a TV.

An USB connector 122 is a connector for performing USB connection with an external device such as a personal computer. A serial driver circuit 1231 is a circuit for converting the output signal of the above serial block 1046 into voltage in order to perform serial communication with an external device such as a personal computer. An RS-232C connector 1232 is a connector for conducting serial communication with an external device such as a personal computer.

A SUB-CPU 109 is a CPU which incorporates ROM-RAM in one chip. The SUB-CPU 109 also outputs the output signal of the operation key units SW 1 to SW 13 and the remote control light receiving part 6 to the above CPU block 1043 as operation information of user, and converts the camera state output from the above CPU block 1043 into a control signal of the after-mentioned sub LCD 1, AF LED 8, strobe LED 9, and buzzer 113, and then outputs the control signal.

The sub LCD 1 is a display part for displaying the number of imageable sheets, for example. The LCD driver 111 is a driving circuit for driving the above sub LCD 1 by the output signal of the foregoing SUB-CPU 109.

The AF-LED 8 is an LED for displaying a focusing state at the time of photographing. The strobe LED 9 is an LED for displaying a charged state of strobe, and glows when the strobe is completely charged. The AF LED 8 and the strobe LED 9 may be used for another display such as during memory access.

The operation key units SW1 to SW13 are key circuits operated by a user. The remote control light receiving part 6 is a light receiving part for a signal of remote control transmitter operated by a user.

A voice recording unit 115 is composed of a microphone 1153 for inputting a voice signal by a user, a microphone AMP 1152 for amplifying the input voice signal, and a voice record circuit 1151 for recording the amplified voice signal. A voice reproducing unit 116 includes a voice reproducing circuits 1161 for converting the recorded voice signal into a signal capable of outputting from a speaker, an audio AMP 1162 for amplifying the converted voice signal and for driving a speaker, and a speaker 1163 for outputting the voice signal.

Figure 3:
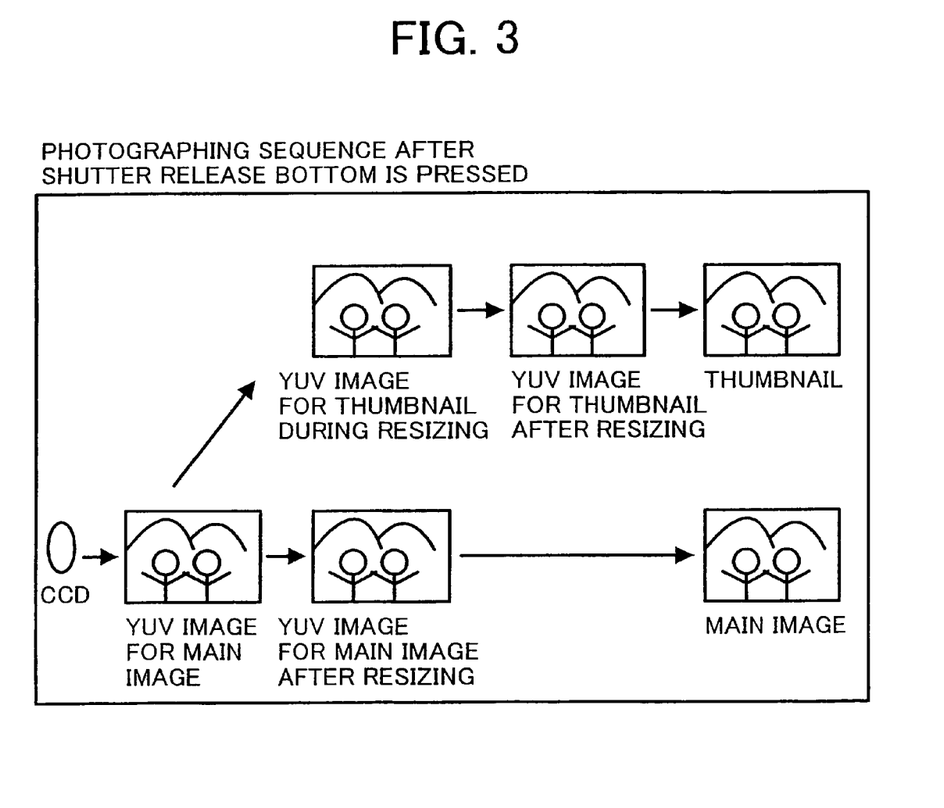
FIG. 3 is a schematic view illustrating the compression operation in the imaging apparatus according to the first embodiment of the present invention.

Next, compression in the first embodiment of the imaging apparatus of the present invention will be explained with reference to FIG. 3. FIG. 3 is a schematic view explaining the compression procedure of the imaging apparatus of the present invention, and shows photographing sequence after the shutter release bottom is pressed (after the shutter release switch SW1 is pressed).

At first, after the shutter release button is pressed, an RGB (Red, Green, and Blue) image is imported by the CCD 101. The RGB image data to which the white balance setup and the gamma setup were applied by the CCD 1 signal processing block 1041 is converted into the YUV (brilliance-chrominance difference) image data of low resolution by the CCD 2 signal processing block 1042. This YUV image corresponds to the YUV image for a main image shown in FIG. 3. A thumbnail and a main image are created based on this YUV image for a main image. At first, the YUV image for a main image is resized and reduced by the RESIZE block 1048 to create a reduced YUV image for a thumbnail, and then the thumbnail is created by compressing the reduced YUV image for a thumbnail by the JPEG CODEC block 1047. An image having a size during reduction may be created depending upon a creating process. As an example, FIG. 3 shows the YUV image for a thumbnail during resizing and the YUV image for a thumbnail after resizing. As a method for creating a main image, at first, the YUV image for a main image is changed to a predetermined number of pixels by resizing the YUV image for a main image, and the main image is created by compressing the resized YUV image for a main image with the most appropriate compression rate.

Figure 4:
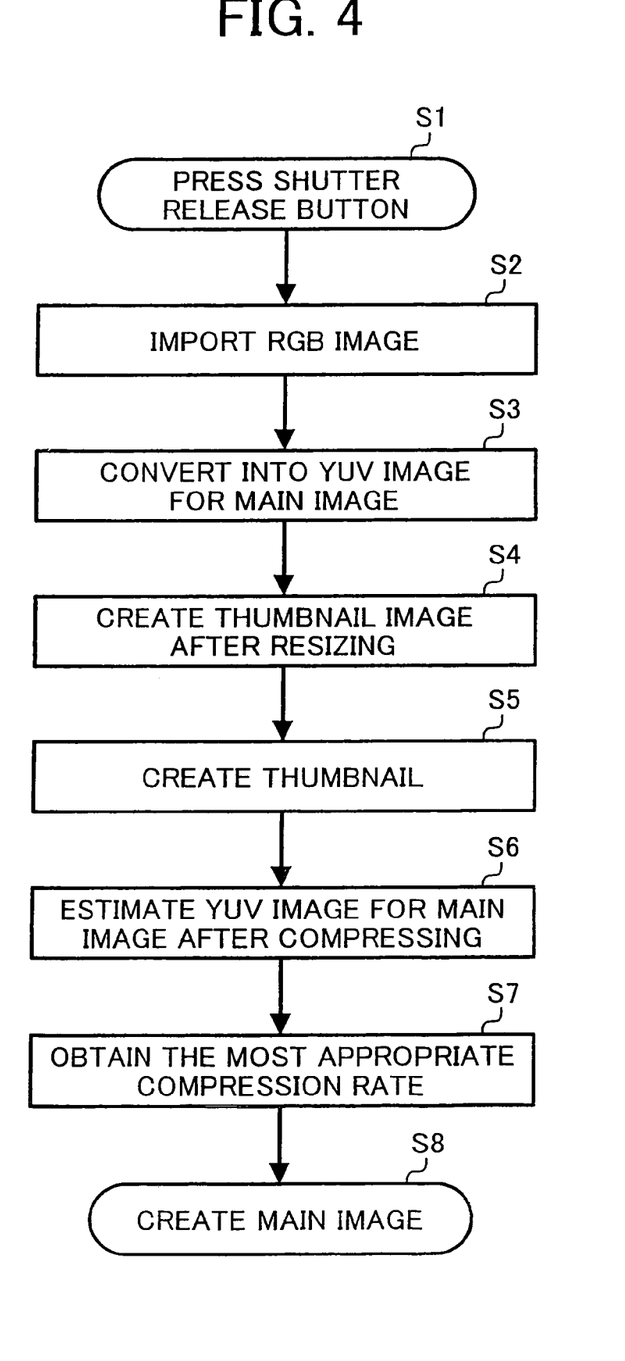
FIG. 4 is a flow chart illustrating the compression operation in the imaging apparatus according to the first embodiment of the present invention.

FIG. 4 is a flow chart illustrating the operations of the first embodiment of the imaging apparatus of the present invention.

As shown in FIG. 4, first of all, the shutter release button is pressed (S1), the image imaged by the zoom lens 71a and the focus lens 72a is imported as the RGB image by the CCD 101 (S2). Next, the obtained RGB image data is converted into the YUV image data for a main image (S3). The reduced YUV image for a thumbnail is created by resizing and reducing the YUV image for a main image (S4). The thumbnail is created by compressing the reduced YUV image for a thumbnail (S5). In order to obtain the most appropriate compression rate in a short time, the present invention uses the data generated when the thumbnail is created. More particularly, a size after compressing the YUV image for a main image is estimated from the size after compressing the YUV image for a thumbnail (S6). Next, a compression rate for fitting the compression size into a target size is obtained (S7), and the main image is created by the obtained compression rate (S8).

Figure 5:
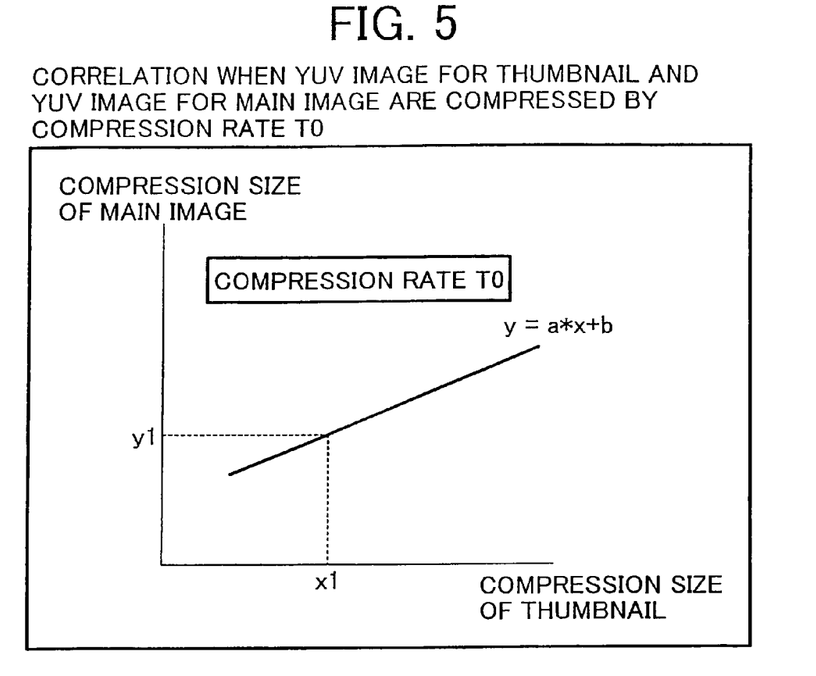
FIG. 5 is a graph for obtaining a compression rate in the imaging apparatus according to the first embodiment of the present invention.

FIG. 5 is a graph illustrating a method for obtaining the compression rate of the main image in the first embodiment of the imaging apparatus of the present invention. The graph shows an example for obtaining the compression rate of the main image by using the data when the above mentioned thumbnail is created. The graph also indicates the correlation when the YUV image for the thumbnail and the YUV image for the main image are compressed by the same compression rate (this compression rate is adopted as T0). This embodiment is explained when the correlation is assumed as a straight line.

At first, if the size after compressing the YUV image for the thumbnail is X, and the size after compressing the YUV image for the main image is Y, the relationship between X and Y is expressed as y=a* x+b (formula 1) by using the coefficients a, b. When this formula 1 is specified, a plurality of pairs of (x, y) is obtained by compressing a plurality of photographed images with the compression rate T0, and then the coefficients a, b are obtained by using the least-square method from the plurality of pairs of (x, y). The obtained coefficients a, b are substituted to the formula 1. Accordingly the formula 1 is specified.

When a photograph is taken, the thumbnail is created before creating the main image. When the thumbnail is compressed, the compression is conducted by the predetermined compression rate T0. The size after the YUV image for a thumbnail is compressed by the compression rate T0 is adopted as x1. If x1 is substituted into the formula 1, the size y1 when the YUV image for a main image is compressed by the compression rate T0 is obtained. After a compression size when the main image is compressed by the compression rate T0 is anticipated, correction is carried out from (T0, y1), and then the compression rate T1 for fitting the compression size into a target size is obtained.

Next, a second embodiment of the imaging apparatus of the present invention will be described.

Figure 6:
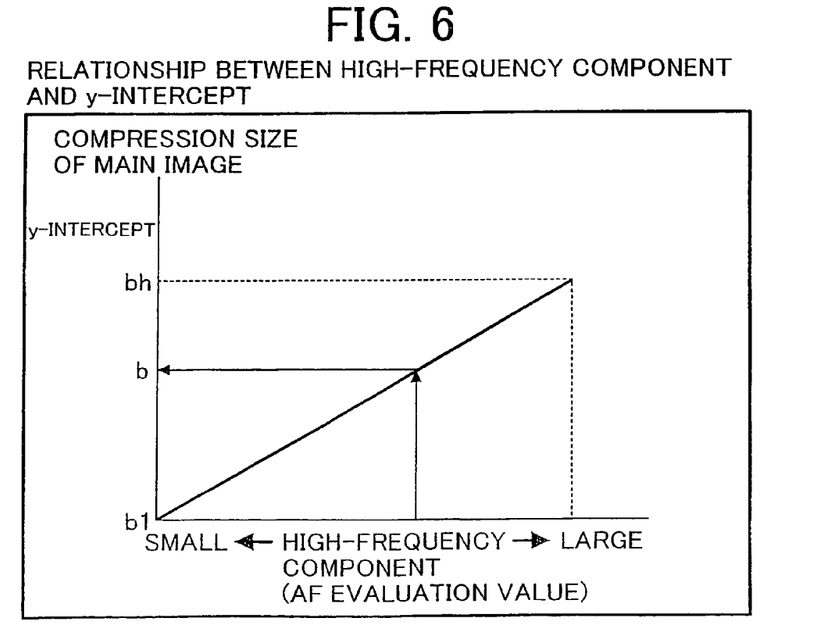
FIG. 6 is a graph for obtaining a compression rate in the imaging apparatus according to the second embodiment of the present invention.
Figure 7:
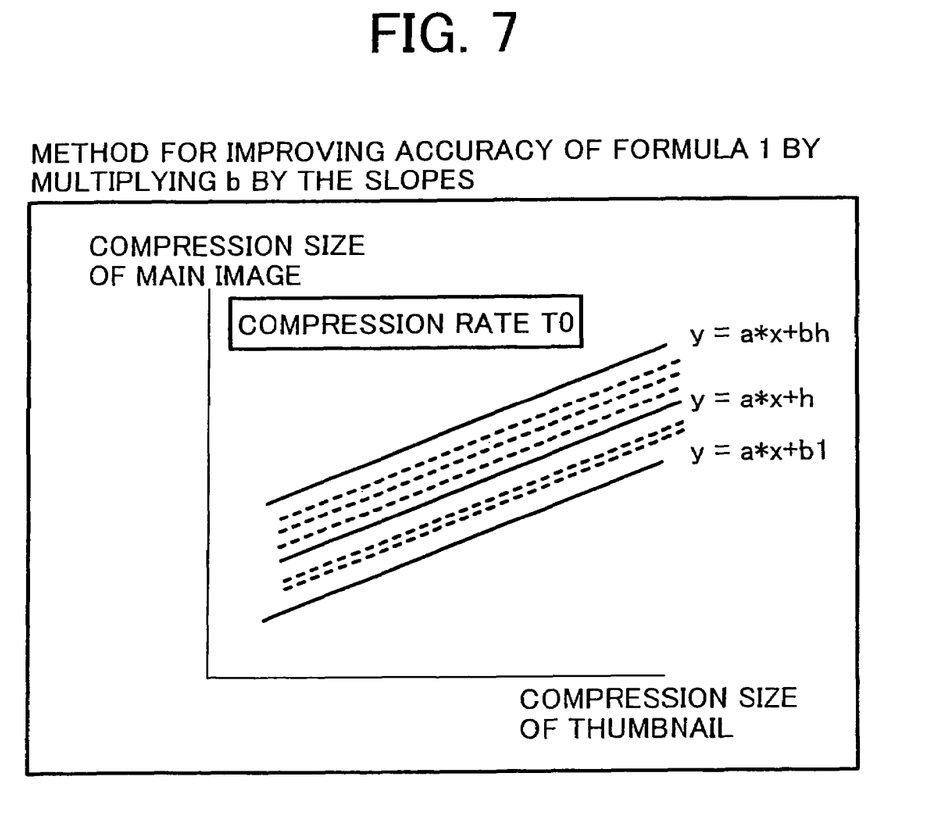
FIG. 7 is a graph illustrating the method for improving the accuracy of the compression rate in the imaging apparatus according to the second embodiment of the present invention.

FIGS. 6, 7 are graphs illustrating the method for obtaining a compression rate of main image in the second embodiment of the imaging apparatus of the present invention. FIG. 6 shows the relationship between the high-frequency component and y-intercept of the formula 1. FIG. 7 illustrates a method for improving accuracy, which multiplies b of the formula 1 by a value depending upon an image. In the embodiment of the present invention, regarding the method for obtaining the formula 1, the high-frequency component of image just before photographing is applied to the above correlation. For example, a numerical value of high-frequency component is measured from an external sensor or an AF evaluation value of image imported just before photographing. As shown in FIG. 6, y-intercept having the lowest level of high-frequency component is adopted as bl, and y-intercept having the highest level of high-frequency component is adopted as bh. In the proportionality relationship between the numerical value of high-frequency component and y-intercept, y-intercept is obtained from the numerical value of high-frequency component. More particularly, as shown in FIG. 7, the accuracy of the formula 1 is improved by multiplying b by a value (variable) of h (high) or l (low) depending upon high-frequency component of an image such as y=a*x+b, y=a*x+bh, and y=a*x+bl, so that a further accurate estimation can be achieved. As a method for obtaining a numerical value of high-frequency component, a photographed image may be compressed by a compression table in which only high-frequency becomes effective, and may be correlated with a compression size.

In this way, the main image is created by the same method as the first embodiment shown in FIG. 4. In other words, first of all, the shutter release button is pressed (S1), and an RGB image is imported from the CCD 101 (S2). Next, the obtained RBG image data is converted into a YUV image data for a main image (S3). The YUV image for a main image is resized and reduced to create the reduced YUV image data for a thumbnail (S4). The thumbnail is created by compressing the YUV image for a thumbnail (S5). Next, the size after the YUV image for the main image is compressed is estimated from the size after the YUV image for the thumbnail is compressed and y-intercept obtained from the numerical value of high-frequency component (S6). Next, the compression rate for fitting the compression size into a target size is obtained (S7), and then a main image is created by the obtained compression rate (S8).

Next, a third embodiment of the imaging apparatus of the present invention will be described.

Figure 8:
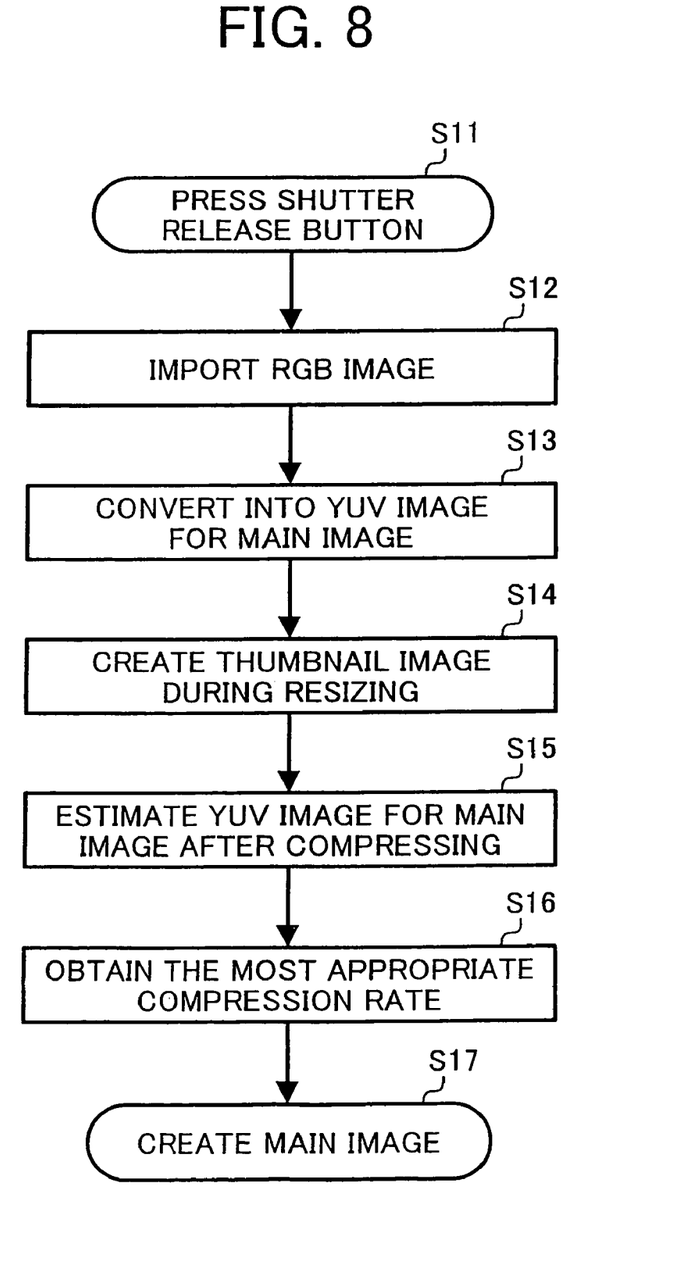
FIG. 8 is a flow chart illustrating the compression operation in the imaging apparatus according to the third embodiment of the present invention.

FIG. 8 is a flow chart illustrating the operations of the third embodiment of the imaging apparatus of the present invention.

In the above described first embodiment, the data used for obtaining the compression rate is the data using the result of creating the thumbnail. However, in this embodiment, data which is obtained during creating the thumbnail is used. More particularly, when an image of VGA size (such as the YUV image for the thumbnail during resizing illustrated in FIG. 3) is created during resizing to the thumbnail, the compression size is obtained by compressing the VGA image with the compression rate T0. The compression size when the main image is compressed by the compression rate T0 is estimated from this compression size.

In other words, as shown in FIG. 8, first, the shutter release button is pressed (S11), and an RGB image is imported from the CCD 101 (S12). Next, the obtained RGB image data is converted into YUV image data for a main image (S13). The YUV image for a thumbnail during resizing generated during resizing the YUV image for a main image is created (S14). The size after the YUV image for a main image is compressed is estimated from the size after the YUV image for a thumbnail during resizing is compressed (S15). Next, a compression rate for fitting the compression size into a target size is obtained (S16), and then the main image is created by the obtained compression rate (S17).

In this embodiment, unlike the first embodiment, the number of compression processes is increased; however, the image size is large, so the accuracy is improved, and the number of corrections is decreased.

As described above, the present invention was described with reference to the drawings; however, the specific structure is not limited to the embodiments, and if the structure is changed within a range which does not deviate from the subject matter of the present invention, the structural change is included in the present invention.

For example, in the above embodiments, the compression rate is obtained based on the formula 1; however, if the compression size is not fitted in the proximity of the target size by using the compression rate, the correction and compression may be repeated.

In the above embodiments, the digital still camera is used as the example of imaging apparatus; however, the imaging apparatus is not limited to the digital still camera. The imaging apparatus may comprises another image recording device and display device as long as the imaging apparatus takes an image or a video image and comprises a device to create a reduced image for display and a device to compress an image to a fixed length. Moreover, the imaging apparatus of the present invention can be applied to an electronics device which does not include the recording device and the display device of an image. Accordingly, the imaging apparatus of the present invention can be applied to every electronics device.

In the above embodiments, the most appropriate compression rate is obtained based on the formula 1, but there is no need for the formula 1 to be the straight line. Any mathematical model can be used for the formula 1 as long as a mathematical model has output with respect to input of a numerical value. Moreover, in the above embodiments, the most appropriate compression rate is obtained based on the formula 1; however, in order to obtain a further accurate most appropriate compression rate by recompressing from various situations, an image after compression may be determined by using a determination device and the image may be corrected by using a correction device.

As described above, according to the structure of the present invention, the amount of time for a fixed length of the main image is reduced, so the number of compression processes can be reduced. More particularly, according to the imaging apparatus of the present invention, the reduced image for display (thumbnail) is created, and the most appropriate compression parameter is estimated by using the compression effect of the thumbnail. The main image is created based on the most appropriate compression parameter, so it is not necessary to repeatedly compress the image, and the amount of time for a fixed length of the main image can be substantially reduced.

According to the imaging apparatus of the present invention, as the most appropriate compression parameter, the compression parameter when the main image before compressing is compressed to the reduced image for display and the compression size are used, so the most appropriate compression parameter can be estimated more preciously.

According to the imaging apparatus of the present invention, the mathematical model is used more specifically, and the most appropriate compression parameter can be estimated by inputting the compression effect to the mathematical model. Accordingly, the most appropriate compression parameter can be estimated more easily.

According to the imaging apparatus of the present invention, the data of the image before the imaging demand or the main image before compressing of just after imaging and the data when the reduced image for display is created are used, so that a further accurate most appropriate compression parameter can be estimated.

According to the imaging apparatus of the present invention, the high-frequency component extracted from the image before the imaging demand or the main image before compressing of just after imaging and the data created by the device to create a reduced image for display are used, so a still further accurate most appropriate compression parameter can be estimated.

According to the imaging apparatus of the present invention, the high-frequency component extracted from the main image before the imaging command or the main image before compressing of just after imaging and the data when the reduced image for display are specifically used in the mathematical model. The most appropriate compression parameter can be estimated by inputting the compression result to the mathematical model, and the most appropriate compression parameter having a high accuracy can be easily estimated.

According to the imaging apparatus of the present invention, the intermediate image during creating the reduced image for display is used, so the amount of time for a fixed length of the main image can be further reduced.

According to the imaging apparatus of the present invention, it further comprises the determination device to determine whether the size of compression image compressed based on the most appropriate parameter is in the proximity of a target size or not and the correction device to correct the most appropriate compression parameter, so that the operation can be re-conducted, and a further complete imaging apparatus can be provided.

According to the imaging method of the present invention, the reduced image for display (thumbnail) is created. The most appropriate compression parameter is estimated by using the compression result of the thumbnail. The main image is created based on the most appropriate compression parameter, so it is not necessary to repeatedly compress, and the amount of time for a fixed length of the main image can substantially reduced.

According to the imaging method of the present invention, as the most appropriate compression parameter, the compression parameter when the main image before compressing is compressed to the reduced image for display and the compression size are used, so the most appropriate compression parameter can be estimated more preciously.

According to the imaging method of the present invention, the mathematical model is used more specifically, and the most appropriate compression parameter can be estimated by inputting the compression effect to the mathematical model. Accordingly, the most appropriate compression parameter can be estimated more easily.

According to the imaging method of the present invention, the data of the image before the imaging demand or the main image before compressing of just after imaging and the data when the reduced image for display is created are used, so that a further accurate most appropriate compression parameter can be estimated.

According to the imaging method of the present invention, the high-frequency component extracted from the image before the imaging demand or the main image before compressing of just after imaging and the data created by the device to create a reduced image for display are used, so a still further accurate most appropriate compression parameter can be estimated.

According to the imaging method of the present invention, the high-frequency component extracted from the main image before the imaging command or the main image before compressing of just after imaging and the data when the reduced image for display are specifically used in the mathematical model. The most appropriate compression parameter can be estimated by inputting the compression result to the mathematical model, and the most appropriate compression parameter having a high accuracy can be easily estimated.

According to the imaging method of the present invention, the intermediate image during creating the reduced image for display is used, so the amount of time for a fixed length of the main image can be further reduced.

According to the imaging method of the present invention, it further comprises the determination device to determine whether the size of compression image compressed based on the most appropriate parameter is in the proximity of a target size or not and the correction device to correct the most appropriate compression parameter, so that the operation can be re-conducted, and a further complete imaging apparatus can be provided.

What is claimed is:

1. An imaging apparatus, comprising:
   an imaging device to take an image;
   a device to create a reduced image for display by resizing and reducing the image, and compressing the resized and reduced image at a compression rate T0;
   a device to obtain a size y1 of a compressed main image when the image is compressed at the compression rate T0, by using a size x1 of the reduced image for display compressed at the compression rate T0, and using a correlation y=a*x+b, where y is a size of a compressed main image at a specified compression rate, x is a size of a reduced image for display at the specified compression rate, and a and b are coefficients, and to obtain another compression rate T1 for compressing the image in a proximity of a target size based on the compression rate T0 and the obtained size y1; and
   a compression device to compress the image to the target size by the another compression rate T1,
   wherein a y-intercept of the correlation is modified from b to b*L when a high-frequency component extracted from the image before an imaging instruction or the image immediately after the imaging is a minimum level corresponding to a value of L, and the y-intercept of the correlation is modified from b to b*H when the high-frequency component extracted from the image before the imaging instruction or the image immediately after the imaging is a maximum level corresponding to a value of H, and a value of the high-frequency component and the y-intercept have a proportional relationship.

2. An imaging method, comprising the steps of:
   taking an image;
   performing on a processor the steps of:
   creating a reduced image for display by resizing and reducing the image, and compressing the resized and reduced image at a compression rate T0;
   obtaining a size y1 of a compressed main image when the image is compressed at the compression rate T0, by using a size x1 of the reduced image for display compressed at the compression rate T0, and using a correlation y=a*x+b, where y is a size of a compressed main image at a specified compression rate, x is a size of a reduced image for display at the specified compression rate, and a and b are coefficients, and obtaining another compression rate T1 for compressing the image in a proximity of a target size based on the compression rate T0 and the obtained size y1; and
   compressing the image to the target size by using the another compression rate T1,
   wherein a y-intercept of the correlation is modified from b to b*L when a high-frequency component extracted from the image before an imaging instruction or the image immediately after the imaging is a minimum level corresponding to a value of L, and the y-intercept of the correlation is modified from b to b*H, when the high-frequency component extracted from the image before the imaging instruction or the image immediately after the imaging is a maximum level corresponding to a value of H, and a value of the high-frequency component and the y-intercept have a proportional relationship.

3. The imaging apparatus according to claim 1, wherein the coefficients a, b of the correlation are obtained by a least-square method by compressing a plurality of images at the compression rate T0 and obtaining multiple pairs of (x, y).

4. The imaging method according to claim 2, wherein the coefficients a, b of the correlation are obtained by a least-square method by compressing a plurality of images at the compression rate T0 and obtaining multiple pairs of (x, y).

* * * * *